United States Patent [19]

Sibley

[11] 3,956,831

[45] May 18, 1976

[54] ATTITUDE METER WITH ROTATABLE ARCUATE SCALE

[76] Inventor: Scott F. Sibley, P.O. Box 4476 Arlington, Va. 22204

[22] Filed: Feb. 26, 1975

[21] Appl. No.: 553,088

[52] U.S. Cl. .................................. 33/352; 33/364; 33/391
[51] Int. Cl.² ........................................ G01C 17/00
[58] Field of Search ............ 33/352, 378, 397, 365, 33/346, 364, 391, 272, 354

[56] References Cited
UNITED STATES PATENTS

| | | | |
|---|---|---|---|
| 1,097,925 | 5/1914 | Johnson | 33/352 |
| 1,270,178 | 6/1918 | Lehtinen | 33/352 |
| 1,860,259 | 5/1932 | Marshall | 33/352 |
| 2,026,895 | 1/1936 | Hudlow | 33/397 |
| 2,765,541 | 10/1956 | Story | 33/378 |

FOREIGN PATENTS OR APPLICATIONS

| | | | |
|---|---|---|---|
| 137,910 | 1/1920 | United Kingdom | 33/365 |

*Primary Examiner*—William D. Martin, Jr.
*Attorney, Agent, or Firm*—Charles M. Leedom, Jr.; Donald A. Gardiner, Jr.; Daniel W. Sixbey

[57] ABSTRACT

This invention relates to an attitude meter which measures the orientation of a plane surface with respect to the magnetic North direction and a horizontal plane. The meter includes a hollow transparent sphere containing liquid for supporting a compass and a vertical indicator, combined with a rotatable arcuate scale for facilitating visual reading of the compass and relative position of the vertical indicator. More particularly, the arcuate scale includes vertical orientation indicia and is mounted for rotational displacement to a position immediately adjacent the vertical indicator. By this arrangement the vertical angle of the surface being measured may be read directly from the arcuate scale and the direction of inclination relative to the magnetic North may be determined from the point of intersection of the arcuate scale and the liquid supported compass.

20 Claims, 10 Drawing Figures

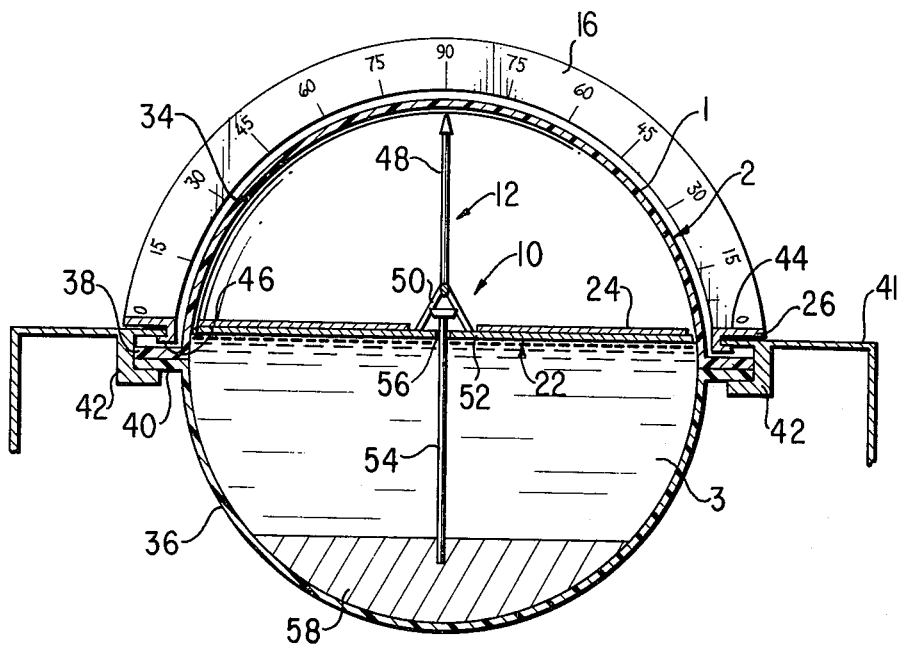
FIG. 3
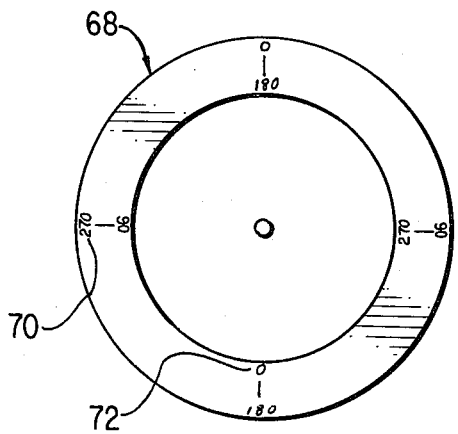
FIG. 4
FIG. 5

3,956,831

ATTITUDE METER WITH ROTATABLE ARCUATE SCALE

BACKGROUND OF THE INVENTION

1. Field of the Invention

This invention relates to attitude meters for determining the orientation of a surface with respect to the direction of magnetic North and a horizontal plane.

2. Discussion of the Prior Art

Attitude meters for indicating the orientation of a surface with respect to magnetic North and a horizontal plane are known in the art. Such meters find a variety of applications as for example, construction, exploration and mining (principally for determining strike and dip), surveying, and navigation. In an attempt to obtain greater accuracy while reducing the cost of complicated gyroscopically stabilized platforms, it is known to employ liquid supported floating indicators within spherical transparent globes such as disclosed in U.S. Pat. Nos. 1,294,710 to Roland issued Feb. 18, 1919 and 1,376,727 to Pentz et al issued May 3, 1921. While such meters are suitable for the purposes disclosed, difficulty arises by virtue of the indicia inscribed on the outer surfaces of spherical globes since such indicia tend to obstruct a clear view of the floating indicator especially at the pole or top of the sphere. Obstruction of view becomes a specially difficult problem where great accuracy is desired since a large number of inscribed indicia lines must be used. Also, the instrument's accuracy is limited by the number of lines that can by physically inscribed on the spherical surface.

An alternative to the use of inscribed indicia is disclosed in U.S. Pat. No. 1,009,832 to Curtiss issued Nov. 28, 1911, wherein arched bands mounted within a transparent casing cooperate to indicate the angular position of a base. However, the arched bands disclosed in the Curtiss patent fail to simultaneously indicate the orientation of the base both with respect to a horizontal and a vertical direction in a manner which is easily read since the arches are both mounted within the casing requiring angles oblique to the gimballed supports to be read from both scales. Curtiss makes no suggestion as to how the arched bands might be employed in a float type attitude meter so as to enable more accurate visual readings.

While float type meters enjoy a substantial cost advantage over geometric instruments employing complicated gimballed supports, certain inaccuracies may result unless frictional contact is prevented between the float and the casing of the float type meter. One attempt to solve this problem has been to provide a bearing for the float having sufficiently low frictional characteristics so as not to interfere with the accuracy of the output readings while at the same time permitting limited universal movement of the meter. Such bearings are often characterized by a central opening in a floating compass disk to permit a fixed bearing rod to be inserted therethrough. Examples of such bearings are disclosed in U.S. Pat. Nos. 1,754,055 to Senter issued Apr. 8, 1930 and 3,585,728 to Ogg issued June 22, 1971. The utility of such bearings has been impaired in the past by the need to enlarge the central opening of the disk sufficiently to accommodate limited universal motion of the compass about the fixed rod. Also, none of the prior art instruments discussed above provides a single structural means for automatically pointing to the precise direction of inclination.

SUMMARY OF THE INVENTION

It is a general object of this invention to overcome the deficiencies in the prior art relative to attitude meters such as are discussed above. More particularly, the subject invention facilitates visual reading of a float type attitude meter by providing a vertical indicator supported on a floating compass within a transparent sphere in combination with an arcuate scale adapted to rotatively sweep over the entire outer surface of the sphere. By this arrangement the arcuate scale may be rotationally displaced to a position immediately adjacent the vertical indicator to permit the vertical angle to be read from the arcuate scale and the direction of inclination relative to magnetic North to be read from the intersection of the arcuate scale and the floating compass.

An additional object of this invention is to provide an attitude meter having a support base which may be adjusted to permit determination of overhead surface orientations.

Another basic object of the invention is to facilitate leveling in one vertical plane rather than two by providing simplified means for pointing to the precise direction of inclination of a surface. One such application is the adaptation of the instrument for use in leveling an apparatus such as a surveying instrument (e.g. transit) by the use of a simple adjustment means.

Yet another object of this invention is to provide a meter having a floating compass and a movable bearing within a transparent sphere wherein the bearing is only frictionally supported within the sphere so as to permit the bearing to adjust to significant changes in orientation of the meter without frictionally limiting the motion of the compass within the plane defined by the upper surface of the liquid on which the compass floats. Within certain broad limits, therefore, inclination of the bearing is allowed without allowing the compass itself to come into contact with the sphere, thus permitting complete universal movement of the instrument.

Other objects, features, and advantages of the invention will become apparent from the following drawings, description and claims.

BRIEF DESCRIPTION OF THE DRAWINGS

FIG. 3 is a cross-sectional view of the attitude meter illustrated in FIG. 2 taken along lines 3—3;

FIG. 4 is a partially cutaway side elevational view of a modified adjustable base that may be rotatably displaced with respect to the remaining portions of the attitude meter to measure overhead surface orientation;

FIG. 5 is a top elevational view of a compass scale including first and second sets of orientation indicia corresponding to first and second predetermined fixed orientations of the adjustable base means illustrated in FIG. 4;

DESCRIPTION OF THE PREFERRED EMBODIMENTS

Figure 1:
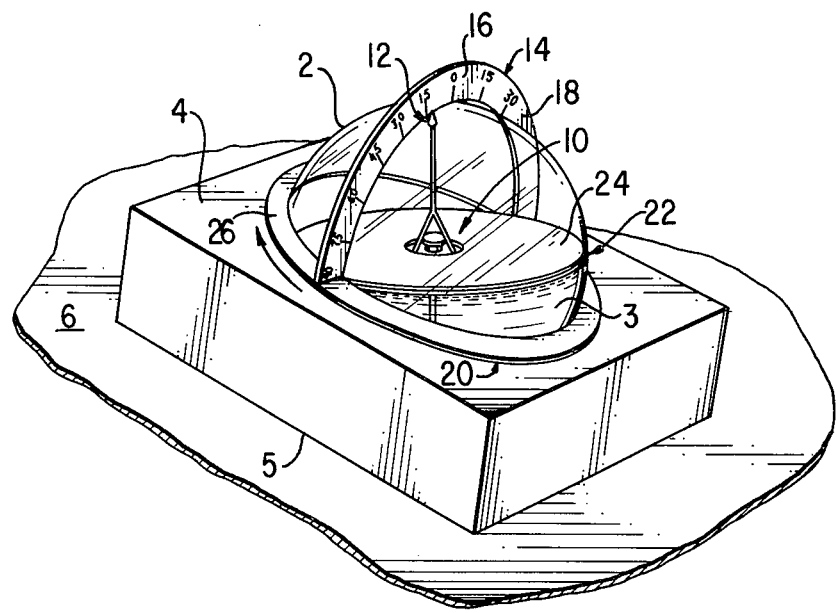
FIG. 1 is a perspective view of an attitude meter constructed in accordance with the subject invention and positioned on a surface the orientation of which is to be measured.

An attitude meter for measuring the orientation of a surface is illustrated in FIG. 1. Specifically in this context, the orientation of the surface being measured is determined by and measured by the angle of inclination of that surface with respect to a horizontal plane, and the direction of inclination of that surface with respect to magnetic North. For purposes of this disclosure, magnetic North is defined to be the magnetic azimuth, from which true North can be determined, and a horizontal plane is defined as an imaginary plane perpendicular to a line passing through the center of the earth.

The attitude meter illustrated in FIG. 1 includes a hollow transparent dome constituting one portion of a hollow sphere 2 which is only partially illustrated in FIG. 1. Although not illustrated in its entirety, the hollow transparent dome 2 is formed of a transparent material such as plastic or glass within which a liquid 3 is provided. A base support means 4 supports sphere 2 in a constant orientation with respect to a surface 6, the orientation of which is to be measured. The base support means 4 includes a bottom support surface 5 (or "measuring" surface) adapted to be placed in contact with the surface to be measured. Of course, the bottom support surface 5 could be nothing more than three support feet adapted to engage a surface to be measured.

Floating on liquid 3 is an indicator means 10, visible through sphere 2, for indicating the direction of inclination of the surface being measured relative to the magnetic North direction, and the vertical angle between surface 6 and a horizontal plane. Indicator means 10 includes a vertical indicator 12 mounted on float means 22 for maintaining the vertical indicator 12 perpendicular to the upper surface of the liquid. The float means 22 is further adapted to maintain the base of vertical indicator 12 (which has a length approximately equal to the inside radius of sphere 2) adjacent the center of sphere 2, whereby the upper end of the vertical indicator is always maintained adjacent the inner surface of the sphere 2. Also mounted on the float means 22 is a circular compass scale 24 having a diameter only slightly smaller than the inside diameter of the sphere 2, whereby the perimeter of the compass scale is always adjacent the inside surface of sphere 2. The manner by which the circular compass scale 24 operates to indicate the orientation of surface 6 with respect to magnetic North will be described below.

For quantifying the vertical angle, scale means 14 is provided including an arcuate scale 16 having vertical orientation indicia 18 inscribed thereon. The scale means further includes an arcuate scale support means 20 for rotatably supporting the arcuate scale on the base support means 4 adjacent the outer surface of sphere 2. This arrangement permits the arcuate scale 16 to sweep over the entire upper surface of the sphere 2 for each 360° turn of the arcuate scale, whereby the arcuate scale 16 may be rotated to a position wherein at least one point of the scale is immediately adjacent the upper end of vertical indicator 12, such as illustrated in FIG. 2.

The arcuate scale support means 20 is further characterized by a ring element 26 having an inside diameter slightly larger than the outside diameter of the sphere 2. Ring element 26 and arcuate scale 16 are each disposed within separate planes passing through the center of the sphere and ring element 26 is rotatably supported on the base support means 4 so as to be parallel with the bottom support surface 5. It is obvious from FIG. 1 and subsequent Figs. that the arcuate scale 16 extends over 180° and is connected at each end to the ring element 26. The arcuate scale 16 and the ring element 26 define first and second planes, respectively, wherein the first plane is perpendicular to the second plane.

Figure 2:
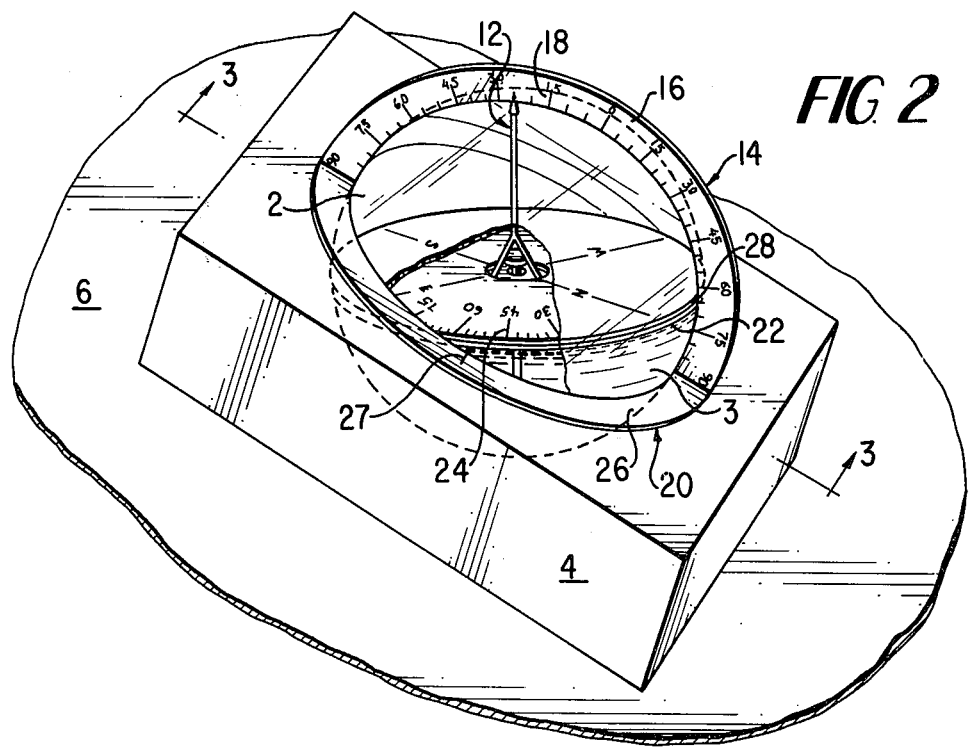
FIG. 2 is a partially cutaway perspective view of the same attitude meter as illustrated in FIG. 1 wherein the arcuate scale has been rotatably displaced to a position immediately adjacent the vertical pointer.

Turning now to FIG. 3, the attitude meter of the subject invention is shown in cross section taken along lines 3—3 of FIG. 2. More particularly, the hollow transparent dome 1 in the form of a closed sphere 2 is formed of two substantially identical transparent hemispheres 34, 36 joined along the perimeter thereof by integral radially extending flanges 38, 40. The joined flanges are in turn connected to the base support means 4 by an L-shaped bracket 42. The upper hemisphere 34 extends over slightly more than one half of the surface of the sphere 2 and the lower hemisphere 36 extends over slightly less than one half of the surface of the sphere 2 so as to permit the flanges 38 and 40 to lie slightly below the horizontal plane passing through the center of the sphere when the base support means 4 is placed on a horizontal surface. By this arrangement, ring element 26 may be rotationally secured to the base support means so that the upper surface 44 of the ring element 26 defines a surface which passes through the exact center of sphere 2. Ring element 26 is provided with a circular hook-like securing element 46 for securing the scale means 14 of FIG. 2 rotatably with respect to the base support means 4. FIG. 3 also illustrates more clearly the arrangement of indicator means 10 which includes the vertical indicator 12 and circular compass scale 24 mounted on float means 22. The vertical indicator 12 further includes a pointer 48 connected with the float means 22 by means of a tripod 50, the need for which will be described hereinafter. Float means 22 may be formed by a disk shaped float 52 formed of a material having a density less than that of liquid 3 to provide sufficient buoyancy to maintain the vertical indicator 12 and circular compass scale 24 in a floating position on the upper surface of the liquid 3. Since pointer 48 and tripod 50 have a combined length slightly less than the radius of the sphere 2, the outer end thereof remains adjacent the inner surface of the sphere regardless of the orientation of the base support means to which the sphere is fixedly attached.

In order to ensure that the indicator means is not subjected to frictional forces which would impair the accuracy of the meter, as well as to provide for universal movement, a bearing arrangement is provided for the disk shaped float which will be called a float bearing hereinafter. The bearing is formed by a rod 54 which extends at one end through a central opening 56 contained in the disk shaped float 52. The other end of rod 54 is secured in a weight 58 which may be formed of cast metal having a lower surface of spherical configuration with a radius of curvature equal to the inside radius of sphere 2. The density of weight 58 is, of course, greater than that of liquid 3, and, accordingly, weight 58 tends to move toward the lower portion of the sphere whenever the orientation of base support means 4, to which sphere 2 may be fixedly attached, changes. Rod 54 is, therefore, maintained in a substantially vertical orientation at all times to permit central opening 56 of the compass to be reduced in size compared with the size hole which would be required if rod 54 were merely fixed with respect to the lower hemisphere 36. By reducing the size of central opening 56 the outer diameter of the circular compass scale may be made slightly larger so as to permit the perimeter thereof to reside closer to the inside surface of sphere 2 thereby permitting greater accuracy in reading the exact intersection of the circular compass scale 24 with the arcuate scale 16. The exact shape of the weight is not critical to the operation of the bearing so long as at least three support points fixed with respect to each other are adapted to be gravitationally held against the inside surface of the sphere. In order to reduce friction, bearings or casters might be located at these three points. Rod 54 must be fixed in orientation with respect to these three support points but need not be perpendicular to the upper surface of the weight as shown in the drawings as long as the rod is oriented so as to always pass through the exact center of the sphere. However, the most desirable arrangement is one in which the rod 54 (or its imaginary extension) passes through the center of a circle defined by the intersection of a plane (which itself is defined by the contact of at least three points of weight 58 with the sphere 2) with the sphere. By arranging the rod 54 perpendicularly to the plane, the rod necessarily passes through the center of the sphere. This is most suitable since the allowance required for the rod 54 at central opening 56 is reduced, as described above, thus permitting universal movement for measurement of a plane in any orientation.

In use, the attitude meter of the subject invention is placed upon a surface, the orientation of which is to be measured. Because the ring element 26 of the scale means is parallel to the bottom surface 5 of the base means, the plane defined by the ring element 26 is parallel to the surface being measured and ring element 26 may only be rotated within a plane parallel to the surface to be measured. Arcuate scale 16, fixedly connected with the ring element, is rotated to a position wherein one point thereof is adjacent the vertical indicator 12 such as is illustrated in FIG. 2. When rotated to this position, the vertical angle (dip) of surface 6 may be read directly from the arcuate scale 16 by virtue of the vertical angle indicia 18 contained thereon. Furthermore, the intersection of the arcuate scale 16 with the circular compass scale 24 occurring at a point 28 is indicative of the direction of inclination (or direction of dip) of surface 6 relative to magnetic North.

The horizontal direction 90° to dip (termed strike) may be read from the intersection of compass scale 24 with ring element 26 at point 27 on the ring 26 as illustrated in FIG. 2.

To understanding more clearly how the direction of inclination relative to magnetic North may be determined, it should be noted that the direction of inclination of a surface with respect to magnetic North is defined as the direction of a horizontal ray (that portion of a line which begins at a specified point and extends in one direction only) which begins at an arbitrary point on the surface to be measured and extends in a direction perpendicular to a horizontal line contained within the surface and passing through the arbitrary point. By convention, the direction of inclination relative to magnetic North of that surface is measured by determining the direction of the ray which is above the surface being measured as opposed to the ray extending in the opposite direction. Accordingly, when the arcuate scale 16 is rotated so that one portion thereof is immediately adjacent the upper end of vertical indicator 12 as in FIG. 2, the arcuate scale will intersect the circular compass scale 24 at that point on the scale which is indicative of the direction of inclination relative to magnetic North of the surface being measured. It is obvious that should surface 6 be inclined directly North the arcuate scale 16 would intersect the North directional indicia contained on the circular compass scale 24 regardless of the vertical inclination of surface 6 so long as the arcuate scale 16 is rotated to a position immediately adjacent the vertical indicator 12. In the same way, arcuate scale 16 will always intersect the compass scale at that portion of the compass scale which indicates the direction of inclination of the surface being measured with respect to magnetic North whenever the arcuate scale 16 is rotated to a position immediately adjacent the vertical indicator 12.

FIG. 4 illustrates a modification of base support means 4 which permits the attitude meter to measure the orientation of overhead surfaces. A first adjustable means 60 is provided for permitting the orientation of bottom support surface 5 and therefore sphere 2 to be displaced 90° with respect to a surface to be measured. Adjustable means 60 includes a planar surface 62 hingedly connected to base support means 4 wherein surface 62 is adapted to be held in a fixed position by an arcuate brace 64 and wing nut 66. FIG. 4 illustrates, in full lines, the planar surface 62 in a 90° displaced (operative) position and illustrates, in dotted line, the position of plane surface 62 when returned to the 0° displaced (inoperative) position. First adjustment means 60 is particularly useful in measuring the orientation of overhead surfaces such as ceilings or overhanging bedding planes. The bearing arrangement for use with a floating compass becomes particularly critical when the surface being measured is inclined at a vertical angle greater than about 60°.

Figure 6:
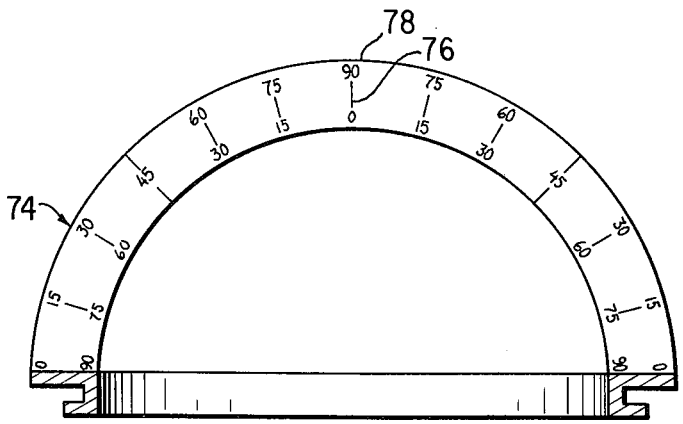
FIG. 6 is an elevational view in partial cross-section of an arcuate scale including first and second sets of vertical angle indicia corresponding to the positions of the adjustment base means illustrated in FIG. 4.

Of course, when employing surface 62 in the operative position, scales 16 and 24 must be modified to include a second set of indicia. FIG. 5 discloses a modified circular compass scale 68 including first and second sets of directional indicia 70, 72 corresponding, respectively, to the inoperative and operative positions of the first adjustment means 60 illustrated in FIG. 4. Similarly, FIG. 6 illustrates a modified arcuate scale 74 which includes first and second sets of vertical orientation indicia, 76, 78 which correspond, respectively, to the inoperative and operative position on the first adjustment means 60 illustrated in FIG. 4.

Figure 7:
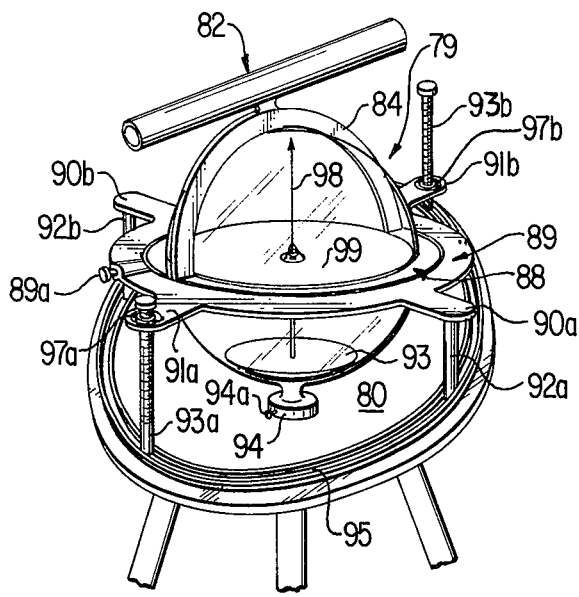
FIG. 7 is a partially cutaway perspective view of an adjustment means for permitting the attitude meter to be used in combination with other apparatus so as to permit leveling of the other apparatus by a simple adjustment means.

A further adaptation of the subject invention is illustrated in FIG. 7, wherein an attitude meter 79 constructed according to the subject invention is employed to permit the leveling of equipment in a simplified manner (in one plane) when compared to leveling apparatus known heretofore. More particularly, the attitude meter is positioned between a tripod support platform 80 and scope equipment 82 (illustrated schmetically) connected directly with the arcuate scale 84 of the attitude meter. Note that the optical axis of the scope equipment 82 is parallel with the plane defined by the arcuate scale. Ring element 88 connected with the arcuate scale 84 is rotatably supported on an outer ring element 89 but may be held in a fixed position by set screw 89a. Ring element 89 includes two pairs of radial extensions 90a, b and 91a, b spaced equally around the perimeter of outer ring element 89. The extensions carry support feet 92a, b and 93a, b, respectively, for supporting outer ring element 89 in any desired orientation with respect to platform 80. To further constrain the attitude meter as illustrated in FIG. 7, the base portion of sphere 93 is connected with platform 80 by a ball and socket connector 94 to permit universal movement of the attitude meter about a predetermined point. This predetermined point lies in the center of a circular track 95 within which the lower extremities of the support feet 92, 93 travel. The lower extremities of support feet 92a, b lie on a line which includes the center of the ball and socket connection so as to provide a pivot axis for the attitude meter and the scope equipment attached thereto. Obviously, this pivot axis (which is parallel to the surface of platform 80) may be rotated about the center of circular track 95.

Supported on each extension 91a, b are adjustable support feet 93a, b, respectively. Feet 93a, b are adjustable by virtue of being screw threaded in journals 97a, b. These journals are, in turn, rotatably mounted in extensions 91a, b, respectively, so as to allow slight inward and outward movement of the lower extremities of feet 93a, b as the attitude meter is rotated about the axis defined by the center of ball and socket 94 and the lower extremities of support feet 92a, b.

Operation of the embodiment of FIG. 7 is carried out as follows: The plane of inner ring 88 is first adjusted by means of adjustable support feet 93a, b, to a position parallel to support platform 80. The arcuate scale is next rotated relative to outer ring element 89 to a position in which the plane of the arcuate scale is perpendicular to the axis defined by ball and socket 94 and the lower extremities of support feet 92a, b. At this point the ring elements 88 and 89 are fixed by set screw 89a. After platform 80 is set in an inclined position, both rings (88 and 89) are then rotated so that arcuate scale 84 is immediately adjacent to vertical indicator 98. Support feet 93a, b may now be adjusted so as to being the instrument to a level position such that vertical indicator 98 lies adjacent to the zero (middle position) of arcuate scale 84. An additional set screw 94a journaled in the socket of the ball and socket connection 94 may now be tightened to hold the attitude meter and scope in a level position. Set screw 89a is loosened and the scope may be rotated to any desired direction as indicated by the compass scale 99 in the same manner of operation as a conventional transit. A third ring marked with directional indicia could also be added and used in the manner of a conventional transit, in order to obtain more precise readings by using an external vernier arrangement.

Figure 8:
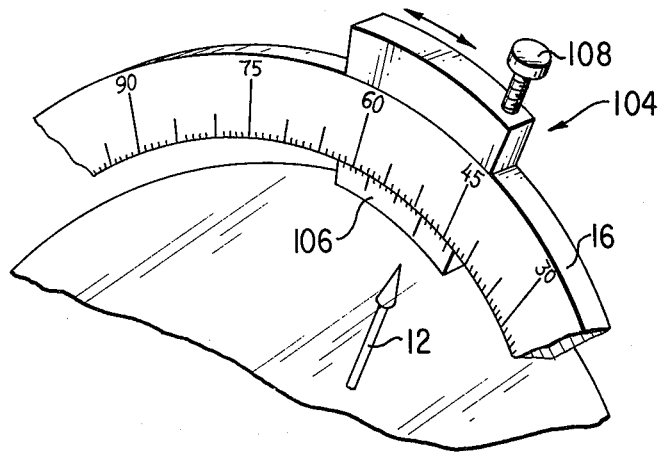
FIG. 8 is a partially cutaway perspective view of a vernier scale for permitting more accurate reading of the position of the vertical indicator relative to the arcuate scale.

FIG. 8 illustrates an addition to scale 16 to include means 104 for permitting more accurate reading of the position of the vertical indicator 12 relative to the arcuate scale 16. This means includes a vernier scale 106 positioned along the arcuate scale 16 by means of a manually operable adjustment screw 108.

Figure 9:
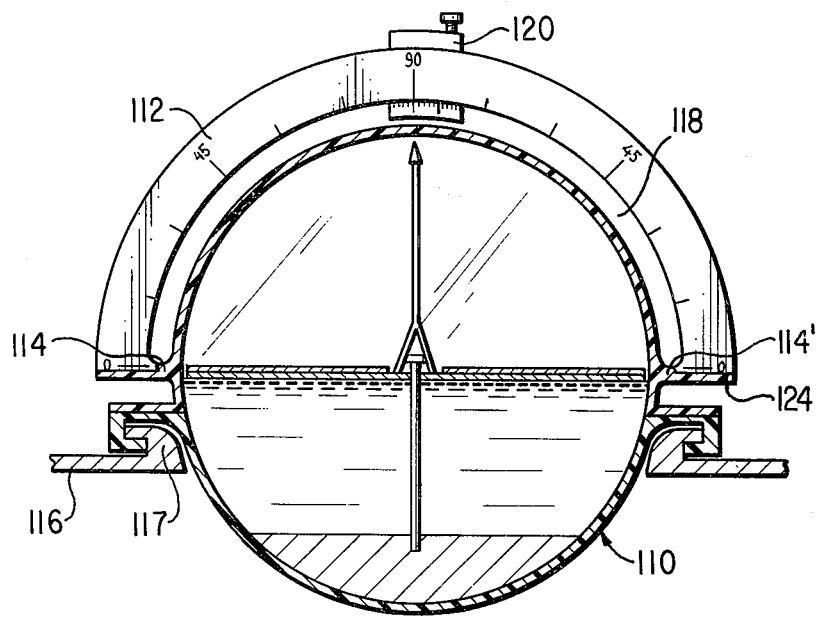
FIG. 9 is a side elevational view of a modified arrangement of an attitude meter in accordance with the subject invention wherein the arcuate scale and hollow sphere are fixedly connected.
Figure 10:
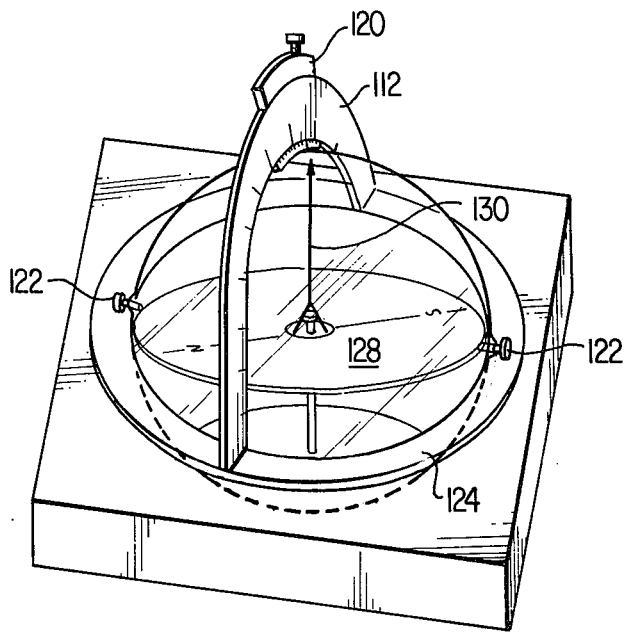
FIG. 10 is a perspective view of the attitude meter of FIG. 9 including damping means for permitting faster reading of the disclosed meter.

Numerous additional modifications of the disclosed attitude meter are, of course, possible within the framework of the disclosed concepts. For example, the transparent sphere may be fixed to the arcuate scale instead of the base means, such as illustrated in FIG. 9, wherein the sphere 110 is fixedly connected to arcuate scale 112 at the end points 114 and 114'. The sphere 110 would then be made rotatable on the base means 116 (only partially illustrated in cross section) by means of a hook-like bearing means 117. Note that a gap 118 remains between scale 112 and the sphere 110 so as to provide room for movement of a vernier element 120. One advantage of the modification illustrated in FIG. 9 is the possibility of incorporating damping means for decreasing oscillations of the compass scale to thereby permit faster reading of the meter. One form of such damping means is illustrated in FIGS. 9 and 10, wherein water tight screws 122 are provided at two points of the ring element 124, 90° displaced from the end points of arcuate scale 112. By placing the damping screws at these points, the screws will always line up with the intersection of ring element 124 and the compass scale 128 whenever the arcuate scale 112 is brought into a position immediately adjacent the vertical pointer 130. When so positioned, the damping screws merely need to be advanced so as to momentarily engage the compass scale 128 thereby damping out oscillations of the compass scale. At all other times the damping screws are left in an inoperative condition so as not to interfere with the accuracy of the meter.

Yet another possible variation of the disclosed attitude meter would be to connect the vertical indicator directly with the bearing rod so as to rely on the bearing rod to find the vertical direction. In accordance with this modification, tripod arrangement 50 of FIG. 3 could be eliminated so as to simplify fabrication of the device.

Additional modifications of the disclosed device are possible including the provision of means for automatically reading the orientation information and rotating the arcuate scale to a point immediately adjacent to the vertical pointer 12 of FIG. 1. The meter described herein may also provide a useful independent (mechanical) means of determining aircraft attitude. The meter scales could be calibrated for various accelerations.

An attitude meter has therefore been disclosed which satisfies the need for greater accuracy by providing a rotatable arcuate scale adapted to cooperate with a float supported vertical indicator and compass scale to facilitate the accuracy and ease involved with reading float type attitude meters known heretofore.

I claim:

1. Apparatus for measuring the orientation of a surface with respect to the direction of magnetic North and with respect to a horizontal plane, comprising
   a. a support base;
   b. magnetic North indicator means mounted on said support base for sensing and indicating the orientation of the surface being measured relative to the direction of magnetic North;
c. vertical indicator means mounted on said support base for sensing and indicating the vertical angle of the surface being measured, said vertical indicator means including
  1. a vertical indicator having an indicator portion and a pivot portion, and
  2. a vertical indicator base support means for maintaining the pivot portion of said vertical indicator at a substantially fixed point relative to said support base and for providing for substantially universal movement of said indicator portion within predetermined limits such that the locus of all points through which said indicator portion may move defines a sector of a sphere; and
d. scale means for quantifying the vertical angle sensed and indicated by said vertical indicator means, said scale means including
  1. an arcuate scale having vertical angle indicia and having an inside radius of curvature slightly larger than the radius of curvature of the sphere sector defined by the movement of said indicator portion, and
  2. an arcuate scale support means for rotatably supporting said arcuate scale with respect to said support base to provide for rotation of said arcuate scale to sweep over the entire surface of the sphere sector defined by movement of said vertical indicator portion, whereby vertical orientation information may be accurately determined from the indicia on the said arcuate scale by rotating the arcuate scale to a position wherein one point of said arcuate scale is immediately adjacent said indicator portion.

2. Apparatus as defined in claim 1, further including a hollow transparent dome having a shape defining a portion of a sphere, said dome having an inside radius greater than the radius of the sphere sector defined by the movement of said indicator portion of said vertical indicator, said dome being mounted on said support base adjacent the indicator sphere but spaced therefrom to avoid interference with the movement of said vertical indicator.

3. Apparatus as defined in claim 2, wherein the outside radius of said dome is slightly less than the inside radius of said arcuate scale and wherein said dome is fixed to said support base.

4. Apparatus as defined in claim 2, wherein said dome is fixed to said arcuate scale for rotational movement therewith.

5. Apparatus as defined in claim 2, wherein said transparent dome is a closed sphere substantially half filled with liquid and said magnetic North indicator means includes float means connected with said vertical indicator means for maintaining said vertical indicator perpendicular to the upper surface of the liquid within said closed sphere.

6. Apparatus as defined in claim 5, wherein said float means further includes a circular compass scale adjacent the upper surface of said liquid within said sphere, said compass scale having a diameter only slightly smaller than the inside diameter of said sphere, whereby the perimeter of said compass scale is adjacent to the inside surface of said sphere.

7. Apparatus as defined in claim 6, wherein said arcuate scale support means includes a ring element having an inside diameter slightly larger than the outside diameter of said sphere, said ring element being disposed within a plane passing through the center of said sphere, said ring element being rotatably supported on said base support means, and said arcuate scale extending over 180° and being connected at each end to said ring element.

8. Apparatus as defined in claim 7, wherein said support base includes a bottom support surface for directly contacting the surface to be measured and for defining a surface parallel to the surface to be measured, said arcuate scale and said ring element defining first and second planes, respectively, said first plane being perpendicular to said second plane, said second plane being parallel to said bottom support surface.

9. Apparatus as defined in claim 5, wherein said float means includes a disk-shaped float and said vertical indicator includes a pointer mounted on said disk-shaped float, said pointer having a length slightly less than the radius of said sphere.

10. Apparatus as defined in claim 9, wherein said magnetic North indicator means includes a bearing means for preventing said disk-shaped float from frictionally engaging the inside surface of said sphere.

11. Apparatus as defined in claim 9, wherein said disk-shaped float includes a central opening and said bearing means includes a weight gravitationally biased against the inside surface of said sphere and a bearing rod fixed at one end to said weight and extending at all times through the center of said sphere and said central opening.

12. Apparatus as defined in claim 11, wherein said weight has a density greater than the density of the liquid contained in said sphere, and wherein said rod extends slightly beyond the center of said sphere, said bearing rod including an end portion larger in dimension than the central opening of said disk-shaped float, whereby said weight, rod and end portion form a float bearing for said disk-shaped float.

13. Apparatus as defined in claim 11, wherein said weight is loosely placed within said sphere so that said weight is gravitationally biased to slide to the lowest point in said sphere whenever said sphere is displaced, said rod is fixed to said weight so as to be vertical whenever said weight is in the lowest part of said sphere.

14. Apparatus as defined in claim 8, wherein said support base includes a first adjustable means for permitting the bottom support surface defined by said support base to be displaced 90°.

15. Apparatus as defined in claim 14, wherein said arcuate scale includes first and second sets of complementary vertical angle indicia corresponding to the 90° displaced positions of said bottom support surface.

16. Apparatus as defined in claim 15, wherein said compass scale includes a second set of directional indicia supplementary to the indicia of said first set.

17. Apparatus as defined in claim 1 further including a geometric instrument requiring a level condition for operation connected with said arcuate scale, wherein said support base includes a support platform adapted to be placed on a surface, said support base further includes universal connection means for providing for said arcuate scale to move universally within predetermined limits about one point fixed with respect to said support platform.

18. Apparatus as defined in claim 17, wherein said arcuate scale support means further includes an inner ring element fixedly connected to said arcuate scale, said inner ring element defining a plane perpendicular to the plane defined by said arcuate scale and wherein said support base includes an outer ring element rotatably connected with said inner ring element and includes an outer ring support means for adjustably positioning said outer ring element with respect to said support platform.

19. Apparatus as defined in claim 18, wherein said outer ring support means includes said outer ring element including a first pair of fixed length support feet extending between said support platform and said outer ring element to define a rotatable pivot axis passing through said one point defined by said universal connection means, said outer ring element further including a pair of adjustable length support feet extending between said outer ring element and said support platform to arcuate scale to be rotated about said rotatable pivot axis.

20. Apparatus as defined in claim 1, wherein said arcuate scale includes a means for permitting more accurate reading of the position of said vertical indicator relative to said arcuate scale, said means including a vernier scale positionable along said arcuate scale.

* * * * *